(12) United States Patent
Yang et al.

(10) Patent No.: US 11,528,142 B2
(45) Date of Patent: Dec. 13, 2022

(54) METHODS, SYSTEMS AND COMPUTER PROGRAM PRODUCTS FOR DATA PROTECTION BY POLICING PROCESSES ACCESSING ENCRYPTED DATA

(71) Applicant: BicDroid Inc, Petersburg (CA)

(72) Inventors: En-Hui Yang, Petersburg (CA); Xiang Yu, Kitchener (CA); Jin Meng, Kitchener (CA)

(73) Assignee: BICDROID INC., Petersburg (CA)

( * ) Notice: Subject to any disclaimer, the term of this patent is extended or adjusted under 35 U.S.C. 154(b) by 639 days.

(21) Appl. No.: 15/728,914

(22) Filed: Oct. 10, 2017

(65) Prior Publication Data
US 2018/0102902 A1 Apr. 12, 2018

Related U.S. Application Data

(60) Provisional application No. 62/406,482, filed on Oct. 11, 2016.

(51) Int. Cl.
| | | |
|---|---|---|
| *H04L 29/06* | (2006.01) | |
| *H04L 9/32* | (2006.01) | |
| *H04L 9/06* | (2006.01) | |
| *G06F 21/44* | (2013.01) | |

(Continued)

(52) U.S. Cl.
CPC ............ *H04L 9/3226* (2013.01); *G06F 21/44* (2013.01); *G06F 21/602* (2013.01); *H04L 9/0618* (2013.01); *H04L 9/0866* (2013.01); *H04L 9/0869* (2013.01); *G06F 2221/2107* (2013.01); *G06F 2221/2125* (2013.01); *G06F 2221/2141* (2013.01)

(58) Field of Classification Search
CPC ... H04L 9/3226; H04L 9/0869; H04L 9/0866; H04L 9/0618; G06F 21/44; G06F 2221/2141; G06F 2221/2125; G06F 2221/2107; G06F 21/602
See application file for complete search history.

(56) References Cited

U.S. PATENT DOCUMENTS

| 5,699,428 | A | 12/1997 | McDonnal et al. | |
|---|---|---|---|---|
| 8,443,207 | B2 * | 5/2013 | Yan ........................ | H04L 9/3271 713/193 |
| 9,135,465 | B2 * | 9/2015 | Cheng ................. | G06F 21/6218 |

(Continued)

OTHER PUBLICATIONS

International Search Report and Written Opinion dated Jan. 15, 2018, PCT/CA2017/051202.

*Primary Examiner* — Tri M Tran
(74) *Attorney, Agent, or Firm* — Bereskin & Parr LLP/S.E.N.C.R.L.

(57) ABSTRACT

The described embodiments relate to data protection methods, systems, and computer program products. A process-based encrypted data access policing system is proposed based on methods of encrypted data file management, process authentication and authorization, Trojan detection for authorized processes, encryption key generation and caching, and encrypted-file cache management. The process-based encrypted data access policing system may be implemented as a kernel level file system filter and a user-mode filter companion application, which polices the reading/writing of encrypted data in either a server system or an endpoint computer and protects data from data breaches and known or unknown attacks including ransomware and/or phishing attacks.

21 Claims, 5 Drawing Sheets

(51) Int. Cl.
*H04L 9/08* (2006.01)
*G06F 21/60* (2013.01)

(56) References Cited

U.S. PATENT DOCUMENTS

| | | |
|---|---|---|
| 9,703,979 B1 | 7/2017 | Yang |
| 2004/0093506 A1 | 5/2004 | Grawrock et al. |
| 2007/0061867 A1 | 3/2007 | Shinohara et al. |
| 2010/0251340 A1* | 9/2010 | Martin .................. G06F 21/51 |
| | | 726/4 |
| 2011/0035783 A1 | 2/2011 | Terasaki et al. |
| 2011/0213971 A1* | 9/2011 | Gurel .................. H04L 9/3271 |
| | | 713/165 |
| 2012/0297188 A1 | 11/2012 | van der Linden |
| 2012/0297189 A1* | 11/2012 | Hayton ................ G06F 16/183 |
| | | 713/165 |
| 2016/0072796 A1 | 3/2016 | Adam et al. |
| 2016/0283727 A1* | 9/2016 | Linga .................... G06F 16/93 |
| 2017/0116433 A1* | 4/2017 | Erofeev ................. H04L 9/088 |
| 2017/0185790 A1* | 6/2017 | Gauda .................. H04L 63/105 |

\* cited by examiner

METHODS, SYSTEMS AND COMPUTER PROGRAM PRODUCTS FOR DATA PROTECTION BY POLICING PROCESSES ACCESSING ENCRYPTED DATA

CROSS-REFERENCE TO RELATED APPLICATION

This application claims the benefit of U.S. Provisional Application No. 62/406,482 filed Oct. 11, 2016, the entirety of which is hereby incorporated by reference.

FIELD

The described embodiments relate generally to data access management and in particular to systems, methods and computer program products for managing data access of processes executing on a computer system.

BACKGROUND

As society becomes more digitized, sensitive information is increasingly being stored and transmitted electronically. As a result, the importance of cybersecurity to our digital society is becoming increasingly fundamental.

Many computer security technologies have been proposed to address cyber security issues. These technologies include firewalls, role-based access controls, data backup services, data encryption and so forth. These technologies often take different approaches to protecting user data. For instance, Firewall technology aims to prevent malware (malicious software) from gaining access to a computer system. Role-based access control restricts system access rights to authorized users, based on roles and privileges assigned to various users. Data backups archive data according to a predetermined schedule to prevent data loss. Encryption encodes a plaintext file into a format which is not recognizable unless decrypted with the corresponding decryption key.

While the above technologies provide some safeguards for user data, they are all vulnerable to sophisticated attacks, as evidenced by the increasing number of large institutions which have had data breaches and/or have been held for ransom. As cyber-physical-human networks and systems become increasingly interconnected, the overall system tends to be only as strong as the weakest link at the weakest moment.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

Embodiments described herein may include methods and systems for managing data access in a computer system. The embodiments described herein may operate to protect against data breaches and known and unknown attacks including, for example, ransomware and phishing attacks. Embodiments of the systems and methods described herein may police processes attempting to access encrypted data files, based on process authentication and authorization methods. Unauthorized processes, such as malware processes, can be denied access to the encrypted data.

Embodiments of the methods and systems described herein may provide a data protection module that may be referred to as a kernel level file system filter. The data protection module may implement methods for process authentication and/or process authorization to police (i.e. manage data access for) processes trying to access data (encrypted data and/or unencrypted data) on a computer system.

In a broad aspect, there is provided a method for managing access to a plurality of data files stored on at least one storage module in a computer system using a data protection module installed on the computer system. The method can include identifying, by the data protection module, a plurality of protected data files in the plurality of data files stored on the at least one storage module, where the plurality of data files stored on the at least one storage module includes the plurality of protected data files and a plurality of unprotected data files, and where each protected data file in the plurality of protected data files is stored on the at least one storage module in an encrypted format; associating each of the protected data files stored on the at least one storage module with a protected file identifier; receiving, by the data protection module, a file access request from a requesting process instance operating on the computer system, where the file access request includes file identifying information corresponding to a particular data file in the plurality of data files; identifying, by the data protection module, the particular data file from the file identifying information; determining, by the data protection module, that the particular data file is one of the protected data files by identifying the associated protected file identifier; determining, by the data protection module, an authorization level of the requesting process instance based on a process authorization level of a corresponding process determined by accessing a configuration map stored on the at least one storage module that defines authorization levels of a plurality of processes; and providing the requesting process instance with a level of access to the particular data file based on the determined authorization level of the requesting process instance.

In some embodiments, the configuration map defines a first group of processes from the plurality of processes having a plaintext authorization level, and a second group of processes from the plurality of processes having a cypher-text authorization level.

In some embodiments, the process authorization level of the corresponding process for the particular data file may be determined to be a plaintext authorization level; and providing the requesting process instance with the level of access to the particular data file can include: decrypting the particular data file to provide a decrypted data file; temporarily storing the decrypted data file in the cache of the computer system; and providing the requesting process instance with access to the decrypted data file in plaintext.

In some embodiments, the process authorization level of the corresponding process for the particular data file may be determined to be a cypher-text authorization level; and providing the requesting process instance with the level of access to the particular data file can include providing the requesting process instance with access to the particular data file in the encrypted format.

In some embodiments, the process authorization level of the corresponding process for the particular data file may be determined to be neither a plaintext authorization level nor a cypher-text authorization level; and providing the requesting process instance with the level of access to the particular data file can include denying the requesting process instance access to the particular data file.

In some embodiments, for each of at least one protected data file, associating that protected data file with the protected file identifier may include storing that protected data file in a file location within a predefined file directory area on the at least one storage module; and the protected file identifier for that protected data file can be the predefined file directory area.

In some embodiments, for each of at least one protected data file, associating that protected data file with the protected file identifier may include modifying data associated with the encrypted data file to include the protected file identifier.

In some embodiments, the method may include, prior to providing the requesting process instance with the level of access, authenticating the requesting process instance by: determining an application program associated with the corresponding process; determining that the requesting process instance includes additional process instructions that do not correspond to the known application program; and modifying the determined authorization level so that providing the requesting process instance with the level of access to the particular data file includes denying the requesting process instance access to the particular data file.

In some embodiments, the configuration map can be defined by: identifying a first plurality of application programs permitted to access files in a plaintext format; defining the first group of processes as the processes in the plurality of processes that correspond to the first plurality of application programs; identifying a second plurality of application programs permitted to access files in a cypher-text format; and defining the second group of processes as the processes in the plurality of processes that correspond to the second plurality of application programs.

In some embodiments, the configuration map may be fixed prior to receiving the file access request.

In some embodiments, the method may include determining, by the data protection module, an initial process authorization level of the corresponding process by accessing the configuration map, where the initial authorization level indicates that the corresponding process is to be denied access to the particular data file; displaying a denial notification through a user application installed on the computer system; receiving a modification input through the user application in response to the denial notification; and updating, by the data protection module, the configuration map based on the modification input to change the initial authorization level of the corresponding process.

In some embodiments, the method may include determining, by the data protection module, an authorization type of the requesting process instance based on a process authorization type of the corresponding process by accessing the configuration map, the authorization type defining at least one file operation that the requesting process instance is permitted to perform; and providing the requesting process instance with the level of access to the particular data file can include permitting the requesting process instance to perform operations on the particular data file in accordance with the determined authorization type and preventing the requesting process from performing operations excluded from the authorization type.

In some embodiments, the method may include receiving, by the data protection module, a second file access request from a second process instance operating on the computer system while the requesting process instance has the level of access to the particular data file, where the second file access request includes file identifying information corresponding to the particular data file; determining that the authorization level of the process corresponding to the second process instance is different from the level of access provided to the process corresponding to the requesting process instance; and denying the second process instance access to the particular data file.

In some embodiments, the method may include receiving, by the data protection module, a second file access request from a second process instance operating on the computer system while the requesting process instance has the level of access to the particular data file, where the second file access request includes file identifying information corresponding to the particular data file; determining that the authorization level of the process corresponding to the second process instance is different from the level of access provided to the process corresponding to the requesting process instance; generating a copy of the particular data file; and providing the second process instance with the second level of access to the copy of the particular data file.

In a broad aspect, there is provided a system for managing access to a plurality of data files. The system can include a processor; at least one storage module coupled to the processor, the at least one storage module storing the plurality of data files and a data protection module; where the processor is configured by the data protection module to: identify a plurality of protected data files in the plurality of data files stored on the at least one storage module, where the plurality of data files stored on the at least one storage module includes the plurality of protected data files and a plurality of unprotected data files, and where each protected data file in the plurality of protected data files is stored on the at least one storage module in an encrypted format; associate each of the protected data files stored on the at least one storage module with a protected file identifier; intercept a file access request from a requesting process instance operating on the processor, where the file access request includes file identifying information corresponding to a particular data file in the plurality of data files; identify the particular data file from the file identifying information; determine that the particular data file is one of the protected data files by identifying the associated protected file identifier; determine an authorization level of the requesting process instance based on a process authorization level of a corresponding process determined by accessing a configuration map stored on the at least one storage module that defines authorization levels of a plurality of processes; and provide the requesting process instance with a level of access to the particular data file based on the determined authorization level of the requesting process instance.

In some embodiments, the configuration map defines a first group of processes from the plurality of processes having a plaintext authorization level, and a second group of processes from the plurality of processes having a cypher-text authorization level.

In some embodiments, the process authorization level of the corresponding process for the particular data file may be determined to be a plaintext authorization level; and the processor can be configured by the data protection module to provide the requesting process instance with the level of access to the particular data file by: decrypting the particular data file to provide a decrypted data file; temporarily storing the decrypted data file in the cache of the computer system; and providing the requesting process instance with access to the decrypted data file in plaintext.

In some embodiments, the process authorization level of the corresponding process for the particular data file may be determined to be a cypher-text authorization level; and the processor can be configured by the data protection module to provide the requesting process instance with the level of access to the particular data file by providing the requesting process instance with access to the particular data file in the encrypted format.

In some embodiments, the process authorization level of the corresponding process for the particular data file may be determined to be neither a plaintext authorization level nor a cypher-text authorization level; and the processor can be configured by the data protection module to provide the requesting process instance with the level of access to the particular data file by denying the requesting process instance access to the particular data file.

In some embodiments, for each of at least one protected data file, the processor can be configured by the data protection module to: associate that protected data file with the protected file identifier by storing that protected data file in a file location within a predefined file directory area on the at least one storage module; where the protected file identifier for that protected data file includes the predefined file directory area.

In some embodiments, for each of at least one protected data file, the processor can be configured by the data protection module to: associate that protected data file with the protected file identifier by modifying data associated with the encrypted data file to include the protected file identifier.

In some embodiments, the processor can be configured by the data protection module to, prior to providing the requesting process instance with the level of access, authenticate the requesting process instance by: determining an application program associated with the corresponding process; determining that the requesting process instance includes additional process instructions that do not correspond to the known application program; and modifying the determined authorization level such that the providing the requesting process instance with the level of access to the particular data file includes denying the requesting process instance access to the particular data file.

In some embodiments, the processor can be configured by the data protection module to define the configuration map by: identifying a first plurality of application programs permitted to access files in a plaintext format; defining the first group of processes as the processes in the plurality of processes that correspond to the first plurality of application programs; identifying a second plurality of application programs permitted to access files in a cypher-text format; and defining the second group of processes as the processes in the plurality of processes that correspond to the second plurality of application programs.

In some embodiments, the configuration map can be fixed prior to receiving the file access request.

In some embodiments, the processor can be configured by the data protection module to: determine an initial process authorization level of the corresponding process by accessing the configuration map, where the initial authorization level indicates that the corresponding process is to be denied access to the particular data file; display a denial notification through a user application installed on the computer system; receive a modification input through the user application in response to the denial notification; and update the configuration map based on the modification input to change the initial authorization level of the corresponding process.

In some embodiments, the processor can be configured by the data protection module to: determine an authorization type of the requesting process instance based on a process authorization type of the corresponding process by accessing the configuration map, the authorization type defining at least one file operation that the requesting process instance is permitted to perform; and provide the requesting process instance with the level of access to the particular data file by permitting the requesting process instance to perform operations on the particular data file in accordance with the determined authorization type and preventing the requesting process from performing operations excluded from the authorization type.

In some embodiments, the processor can be configured by the data protection module to: receive a second file access request from a second process instance operating on the computer system while the requesting process instance has the level of access to the particular data file, where the second file access request includes file identifying information corresponding to the particular data file; determine that the authorization level of the process corresponding to the second process instance is different from the level of access provided to the process corresponding to the requesting process instance; and deny the second process instance access to the particular data file.

In some embodiments, the processor can be configured by the data protection module to: receive a second file access request from a second process instance operating on the computer system while the requesting process instance has the level of access to the particular data file, where the second file access request includes file identifying information corresponding to the particular data file; determine that the authorization level of the process corresponding to the second process instance is different from the level of access provided to the process corresponding to the requesting process instance; generate a copy of the particular data file; and provide the second process instance with the second level of access to the copy of the particular data file.

In a broad aspect there is provided a computer program product for managing access to a plurality of data files stored on at least one storage module in a computer system, the computer program product can include a non-transitory computer readable medium having computer-executable instructions stored thereon, the instructions for configuring a processor to: identify a plurality of protected data files in the plurality of data files stored on the at least one storage module, where the plurality of data files stored on the at least one storage module includes the plurality of protected data files and a plurality of unprotected data files, and where each protected data file in the plurality of protected data files is stored on the at least one storage module in an encrypted format; associate each of the protected data files stored on the at least one storage module with a protected file identifier; receive a file access request from a requesting process instance operating on the computer system, where the file access request includes file identifying information corresponding to a particular data file in the plurality of data files; identify the particular data file from the file identifying information; determine that the particular data file is one of the protected data files by identifying the associated protected file identifier; determine an authorization level of the requesting process instance based on a process authorization level of a corresponding process determined by accessing a configuration map stored on the at least one storage module that defines authorization levels of a plurality of processes; and provide the requesting process instance with a level of access to the particular data file based on the determined authorization level of the requesting process instance.

In some embodiments, the computer program product can further include instructions for configuring the processor to perform the various embodiments of methods for managing access to a plurality of data files described herein.

These and other aspects and features of various embodiments will be described in greater detail below.

BRIEF DESCRIPTION OF DRAWINGS

For a better understanding of the described embodiments and to show more clearly how they may be carried into effect, reference will now be made, by way of example, to the accompanying drawings in which.

Figure 1:
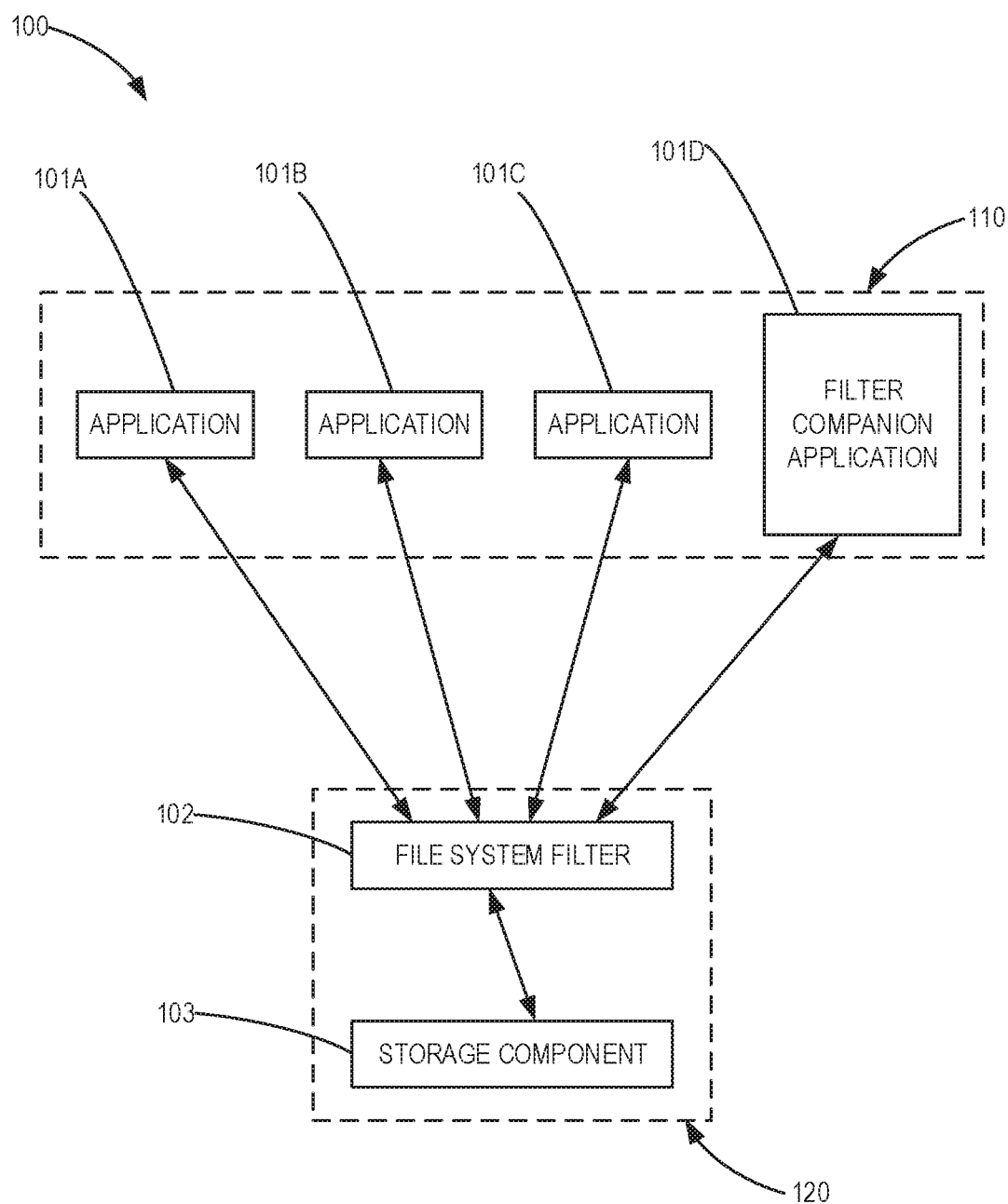
FIG. 1 shows a block diagram of a system for managing access to a plurality of data files in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the drawings and the description is not to be considered as limiting the scope of the embodiments described herein.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "application" is meant to be a shorter form of application program, which refers to a program (i.e. a set of computer instructions) that is designed to realize a specific function for an end user. From an end user's perspective, a program in the computer system is usually referred to as an application. For example, an end user may refer to Microsoft Windows Word as an application of word processing, while in the operating system Microsoft Windows Word is identified as the program winword.exe.

Hereinafter, the term "application" is used to refer to an end user's perspective of an application program. For example, an application may refer to the program with which an end user interacts in order to set up (i.e. define) a configuration map that authorizes one or more applications to access encrypted data. The term "program" may be used to refer to the operating system perspective of the program that executes on the processor as one or more processes to provide the corresponding application. For example, the term "program" may be used to describe the operation of the kernel level file system filter in applying a configuration map to policing a process that is executing a program.

Hacking techniques and malware programs are continually evolving and adapting to security technologies. Even with appropriate security systems in place, malware may still bypass many existing security technologies (e.g. because of human error) using known or unknown forms of intrusion, such as phishing attacks. These attacks often exploit the weakest links and moments (human and/or technological) in order to access computer networks and systems. Once the malicious software is within the computer network/system, many existing security technologies are not equipped to prevent the malware from spreading and/or accessing important and sensitive data files.

Embodiments described herein may provide methods, systems and computer program products which can protect data files even after malware has intruded into, and is operational on, a computer system or network. Such embodiments may include methods and systems for managing access to encrypted data files to protect against data breaches by authenticating and authorizing process requesting data files.

Computer operating systems such as Windows, Linux, UNIX, and Mac OS generally have two executing modes: a kernel mode and a user mode. The kernel mode refers to a privileged status of the CPU when it possesses the privilege to execute any instructions and reference any memory addresses.

The user mode is a non-privileged status for user programs. In user mode, the executing code (i.e. the currently executing user-mode processes) cannot directly access hardware or reference memory addresses. When the CPU operates in the user mode, all user mode processes may be assumed to be untrusted and thus must request use of the kernel by means of a system call.

In a computer system, when a process wants to access a file, the process issues a request for obtaining a reference to this file (called a file handle) to the file system. Depending on the properties of the request and whether the requested file exists, a new file may be created or an existing file may be opened. After a file handle to the file is obtained by the requesting process, the process can write data into the file by passing the file handle and the data to be written to the file system. Similarly, the process reads data from the file by passing the file handle and a location to hold the data to be read to the file system. When the process no longer needs to access the file, the process can issue a request to close the file handle to the file system. In embodiments described herein, all requests for obtaining file handles, writing and reading data, and closing file handles that are issued by a process (i.e. by any non-kernel mode process) can be routed through, or intercepted by, the data protection module before being transmitted to the file system.

Embodiments described herein may manage access to encrypted data files using process-based access policing implemented by a kernel level file system filter (also referred to herein as a data protection module). In such embodiments, authorized processes can be granted access to requested data files (e.g. encrypted data files) while unauthorized processes can be denied access to the requested data files (i.e. prevented from accessing the requested data files or having limited or reduced access to the data file).

In some cases, a process may request a particular level of access to a data file. For example, a first process may request access to the plaintext content of the data file while a second process might only request access to the cypher-text content of the data file. The data protection module may then determine the authorized level of access for the requesting process. Based on the determined authorized level of access, the data protection module may provide the requesting process with the requested level of access, a reduced level of access, or may even deny access to the requested data file.

Embodiments described herein may provide data protection methods employing process-based access policing to encrypted data. For example, a data protection module may be provided for installation on a computing device; the data protection module can be configured to determine or identify a group or zone of protected data files (i.e. those data files to be protected and encrypted); the data protection module can then operate to authenticate processes trying to write data to or read data from a protected (and encrypted) data file; the data protection module may then provide a permission level to the process. The permission level may define the level of access the process has to the data file. For instance, an authenticated process may be granted permission to access the data file in plaintext, an authenticated process may be granted permission to access the cypher-text of the data file, or the data protection module may deny access to an unauthenticated process or even to an authenticated process (e.g. if the process is not authorized to access the requested data file).

The data protection module may also define a permission type for the requesting process. The permission type may define the types of actions the process is authorized to perform in respect of the requested data file. For example, the granted permission type may be one of the following permission types: authorized/permitted to write data to the encrypted file, authorized/permitted to read the encrypted file. The data protection module can be configured to authenticate every process trying to write data to or read data from a protected and encrypted file.

Embodiments described herein may provide a file management scheme for encrypted data files in the kernel mode. In operation, the data protection module (i.e. kernel level file system filter) can respond to all requests from user-mode processes to access any and all data files in the computer system. This data protection module may effectively provide file management for data files within a protected data group or zone. In some embodiments, the protected data files may be stored within a defined region in the file directory of the computer system. Alternatively, the data protection module may determine a directory tree that can be defined based on the storage locations of the protected data files. The data protection module may then implement a fast string search algorithm based on the tree structure of the file system path strings to determine whether a requested data file is a protected data file.

For example, the data protection module may initiate a search tree when it is loaded in the kernel. The data protection module may then define the search tree by detecting, for every data file stored on the storage module(s) associated with the computer system, whether that data file is encrypted. In some cases, the data protection module may define the search tree dynamically, for instance when the data file is accessed by the kernel filter for the first time, which may be in response to a request from any process or application operating on the computer system.

Embodiments described herein may use protected file identifiers to determine whether data files are protected (and also whether they are encrypted in embodiments where all protected files are encrypted). In some cases, the protected file identifier may be a file extension name appended to a protected data file when that data file is stored on a storage module (e.g. physical storage media such as a hard-disk or USB disk). The data protection module may then determine that the file is a protected file by identifying the presence of the protected file extension. In some cases, the protected file extension may be invisible to user mode processes to provide transparent operation to the user applications (e.g., an encrypted Windows Word file will show only its original extension name such as .doc to a Word process). Accordingly, the data protection module may define a file name mapping for protected data files between the user-side file name without the protected file extension and the filter-side file names that include the protected file extension.

Additionally or alternatively, the data protection module may embed a protected file identifier into the protected data file. For example, the protected file identifier may be provided as an encryption token embedded into the file header of an encrypted data file. The data protection module may then access the encryption token in the file header to determine that a particular data file is an encrypted data file.

Additionally or alternatively, the data protection module may record a protected file identifier in the file attribute domain of the computer file system. The data protection module may record an encryption sign or encryption indicator in the file attribute domain for encrypted data files. The data protection module may then identify the sign in the file attributes of a particular data file to determine that the particular data file is an encrypted data file.

Embodiments described herein may provide a process-based access policing system for encrypted data. The system may include one or more storage modules that include physical storage media, a data protection module (kernel level file system filter), and optionally a user-mode filter companion application. A plurality of data files can be stored in the one or more storage modules. At least some of the data files stored in the storage modules may be encrypted (e.g. using random encryption keys). The data protection module may provide an interface between the data files stored in the computer system and various applications trying to access data stored in those data files. The data protection module can perform various operations related to the management of data files on the computer system, such as encrypting data, decrypting data, policing application processes trying to access data (e.g. intercepting requests for data from processes operating on the computer system), authenticating processes, and authorizing processes to access data.

In a general computation system, a process is the execution of a collection of instructions, which are generally referred to as a program. In a Unix-like system, a program is stored in the file system as a program file. The program can be loaded through a system call in the computer kernel level to initiate a process (i.e. initiate the execution of the program instructions). Once initiated, the process can be identified by the kernel using a process ID.

In embodiments described herein, when a currently loaded process attempts to access data stored in the computer system, the data request may be intercepted by the data protection module. The data protection module may then determine, based on information associated with the requested file and the process requesting the file, whether to grant the requested access. The data protection module may apply an authentication and authorization procedure to the process before the process is allowed to access protected data (e.g. encrypted data) in the form of either plaintext or cypher-text.

In some cases, the data protection module may implement a data access management procedure that involve 3 stages:

1. Configuration Stage: An authorization level (e.g. an access permission level) can be defined for each process operating, or that may subsequently operate, on the computer system. In some cases, the configuration map may only include processes that are authorized to access protected data stored on the computer system. The configuration map may also include an authorization type for each authorized process. The configuration map can be provided to the data protection module.
2. Process Authentication Stage: The data protection module may assess the genuine identity of a process requesting data access. The data protection module may also compare this identify information with the processes identified on the configuration map.
3. Process Authorization Stage: The data protection module may determine the authorization level (and in some cases the authorization type) for a requesting process using the configuration map. The data protection module may then permit that process to access the requested data in accordance with the determined authorization level and/or authorization type.

In some embodiments, the configuration map may identify executing process instances based on the corresponding program. Accordingly, each process executing an instance of the corresponding program may then be provided with the same authorization level/type.

In some cases, the system may also include a user-mode filter companion application. The system may provide a duplex channel between the user-mode filter companion application and the data protection module. The user-mode filter companion application may permit a user of the computer system to define and/or modify the authorization level and/or type for one or more processes.

In some cases, the data protection module (or the configuration map) may be configured to initially prevent all processes from accessing any protected data and to report all blocked events to the user-mode filter companion application. The user-mode filter companion application may provide an indication (e.g. a pop up message) to the user for each blocked event. The user-mode filter companion application may provide an interface for the user to modify the permissions for processes executing the program associated with the blocked event.

For example, the user-mode filter companion application may provide a list of access permissions for the user to select from. The access permission options may include, for example, (1) authorization to access plaintext content of an encrypted data file; (2) authorization to access cypher-text content of an encrypted data file; and (3) denying a process from accessing any encrypted data file. The user-mode filter companion application can then send the modified access permission to the data protection module using the dedicated duplex channel. The data protection module may then update the configuration map in response to the user selection.

In some embodiments, the data protection module may have an initial configuration map that includes a first group of application programs whose corresponding processes are allowed to access the plaintext content of encrypted data, and a second group of application programs whose corresponding processes are allowed to access the cypher-text content of encrypted data. The end-user may then modify the configuration map using the user-mode filter companion application.

In some embodiments, the configuration map may be defined using link list data structures. A first link list data structure may include the legitimate application programs whose corresponding processes are allowed to access the plaintext content of encrypted data. A second link list data structure may include the legitimate application programs whose corresponding processes are allowed to access the cypher-text content of encrypted data, and a list of all program names that has access to cypher-text content. All processes corresponding to programs not identified in these link lists may then be denied access to encrypted data.

In some embodiments, the user-side application may be omitted. For example, the configuration map can be fixed for the data protection module installed on a particular computer system. In such cases, local computer users may not be permitted to modify the configuration map. This may be particularly useful in implementations where multiple users can access the same data files (e.g. in server applications).

As mentioned, some embodiments described herein may authenticate requesting processes prior to providing access to requested data files. In such embodiments, the data protection module may make a system call to map the process ID of the requesting process to its corresponding program file path. The data protection module may use this program file path mapping along with the digital signature of the program (stored in the configuration map) to authenticate the requesting process.

In some cases, the data protection module may analyze the requesting process to identify whether Trojan instructions are present in the requesting process. As used herein, the term "Trojan" refers to a set of instructions that is loaded into a process from a source other than the corresponding program (i.e. the corresponding authentic program whose digital signature can be used to identify that process) and protected data files, where that set of instructions is executed as part of that process. If the data protection module determines that Trojan instructions are present in the requesting process, the authorization level of the requesting process can be modified e.g. to deny access to the requested data files. This may prevent unauthorized instructions from piggybacking on the authorization level of the authentic process and in turn causing a data breach. For example, the data protection module may modify the authorization level for a requesting process that would otherwise be permitted to access the plaintext content of encrypted data to deny access to the requested data.

Various methods may be used to detect Trojan instructions. For example, the data protection module may analyze a script language pattern from an unprotected data file written in a particular script language which is to be loaded into a process requesting access to files written in that particular script language. That is, when a process attempts to access data from a data file that is not one of the protected data files, the data protection module may analyze the data file to determine if Trojan instructions are present (and would be loaded into the requesting process).

For instance, consider an implementation in which the data protection module operates to protect php scripts running on a web server, where the php interpreter process is authorized to access a predefined list of php files. In this implementation, when the php interpreter process tries to access a file that is not one of the protected php script files, the data protection module can analyze the file being accessed, detect a php script pattern such as '<?php' and prevent the process from accessing the unprotected data file if such a script pattern is found. Similar processes may be applied to other types of scripting file protection, e.g., Ruby, Python, Perl, Node-JS, Jscript, HTML, etc.

In some embodiments, the data protection module may determine the presence of Trojan instructions by detecting a plug-in or add-in in a process otherwise authorized to access protected data files (i.e. the plaintext content of protected data files). For example, processes corresponding to a Windows Word may be authorized to access a predefined list of .doc files. In such cases, the data protection module may analyze all the Windows Word plug-ins or add-ins and only authorize access for a subset of the plug-ins or add-ins. For instance, the data protection module may only authorize access for plug-ins authorized by the end user.

For instance, when data is to be encrypted or decrypted, the encryption key and/or decryption key can be generated first. The generated key can then be applied to encrypt/decrypt data in a buffer for file reading/writing. In embodiments using symmetric encryption, the encryption key and the corresponding decryption key are the same.

To generate an encryption key, the data protection module may receive input data and generate/output an encryption key based on the input data in a deterministic manner, i.e. the output (encryption key) can be the same as long as input data is the same. Examples of methods for key generation are described in greater details in the Applicant's U.S. patent application Ser. No. 15/178,680 filed on Jun. 10, 2016 and entitled "Methods and computer program products for encryption key generation and management" which has now issued as U.S. Pat. No. 9,703,979, the entirety of which is hereby incorporated by reference. In some examples, such as those described in U.S. Pat. No. 9,703,979, the input data may include input portions: a first portion that includes a unique identifier of a keystore seed and a second portion that includes auxiliary information referred to as keying material or keying information. Given a unique identifier of a keystore seed and the keying material, the identifier may be used to determine a keystore seed and then the keystore seed and the keying material can be combined to generate an encryption key.

In some embodiments, the systems described herein may use encryption key caching to facilitate the encryption and decryption of protected data files. An encryption key hash mapping (also referred to as an encryption key cache) between file identifiers and corresponding encryption keys can be maintained in volatile memory of the computer system. This may allow the data protection module to efficiently record or retrieve an encryption key corresponding to a data file when that file is being encrypted or decrypted. The data protection module may initiate the hash map when the data protection module is loaded (e.g. on system start-up). The hash map may then be defined by recording a file encryption pair that includes a file identifier and the corresponding encryption key at the time the encryption key is generated for the file.

In some embodiments, encryption keys may be generated and cached using a cooperative procedure between the user-mode filter companion application and the data protection module using the duplex channel therebetween. In response to receiving, from a process, a request for a file handle to be used in generating a new encrypted data file, the data protection module may retrieve new file properties for the new encrypted data file (e.g. the location where the data file is to be generated in the file system) and transmit the new file properties to the user-mode filter companion application. The user-mode filter companion application can then use the new file properties in determining a keystore seed (with a unique identifier), generating (randomly) keying material, and generating an encryption key for the new encrypted file using the determined keystore seed and the keying material. The user-mode filter companion application can then transmit the unique keystore seed identifier, the keying material, and the encryption key to the data protection module. The data protection module can then store the keying material together with the unique identifier of the selected keystore seed for the new encrypted data file. The data protection module can also store an encrypted file data pair in the encryption key cache that includes a unique file identifier and the corresponding encryption key.

The data protection module may also access the encryption key cache in response to receiving a request for obtaining a file handle to an existing encrypted data file. The data protection module may identify the unique file identifier from the requested file and attempt to retrieve the corresponding encryption key in the encryption key cache using the unique identifier. If the encryption key cache does not contain the encryption key for the requested file, the data protection module can retrieve the keystore seed identifier and keying material from the encrypted data file. The data protection module can then transmit the keystore seed identifier and keying material to the user-mode filter companion application.

The user-mode filter companion application can then determine the keystore seed using the keystore seed identifier, generate the encryption key for the encrypted data file using the keystore seed and the keying material, and transmit the encryption key to the data protection module. The data protection module can then store file key data representing the keying material together with the unique identifier of the selected keystore seed for the requested encrypted data file in the encryption key cache.

In some embodiments, encryption key generating and caching may be performed in the absence of a user-mode filter companion application (or without requiring communication with the user-mode application). In response to a request for a file handle to a file that would result in creating a new encrypted data file, the data protection module can determine a keystore seed having a unique identifier. The data protection module may then generate (randomly) keying material, generate an encryption key using the keystore seed and the keying material, and then store the keying material together with the keystore seed identifier in the encrypted data file. The data protection module can then store file key data representing the keying material together with the unique identifier of the selected keystore seed for the encrypted data file in the encryption key cache.

In some embodiments, upon receiving a request for obtaining a file handle to an existing encrypted data file, the data protection module may determine a file identifier from the encrypted data file and attempt to retrieve the corresponding encryption key in the encryption cache using the file identifier. If the encryption key cache does not contain the encryption key for the requested file, the data protection module may retrieve the keystore seed identifier and keying material stored in the encrypted data file, retrieve the keystore seed using the keystore seed identifier, and generate the encryption key using the keystore seed and the keying material. The data protection module can then store file key data representing the keying material together with the unique identifier of the selected keystore seed for the requested data file in the encryption key cache.

In response to receiving a request for writing data into a file or reading data from an encrypted data file, the data protection module can retrieve a unique file identifier corresponding to the file, identify a corresponding encryption key in the encryption key cache using the file identifier, and use the encryption key to encrypt or decrypt data before the data is written into the file system or read by the authorized process that issued the request.

In some cases, after all file handles to a file are closed, the encryption key for this file can be purged from the encryption key cache. The encryption keys may be purged in response to the file handles being closed. This may prevent the encryption keys from being accessible after authorized processes are no longer accessing the data from encrypted data files.

In some embodiments, a single keystore seed (and its corresponding keystore seed identifier) can be loaded into the volatile memory of the computer system when the data protection module is loaded. The data protection module may always use this keystore seed along with random keying material to generate encryption keys for files to be created or opened (i.e. to decrypt data before the data is read by an authorized process). However, the keying material, which can be randomly generated for files to be created or read from files to be opened, may be different for each file (and may be generated for each file, or selected randomly for each file).

For example, consider encrypted files that may be accessed by Microsoft SQL Servers. Typically, Microsoft SQL Servers create and/or access a limited number of files, each of which is very large. In such a scenario, one encryption key may be secure enough to encrypt all the files accessed by the Microsoft SQL Servers. Whenever a Microsoft SQL Server writes data into a file, the data protection module can use the single encryption key in the encryption key cache to encrypt the data before the data is written into the file system. Similarly, whenever the Microsoft SQL Servers attempt to read data from a file, the data protection module can use the same encryption key in the encryption key cache to decrypt the data before the data is read by Microsoft SQL Servers.

Embodiments described herein may also incorporate encryption key generation and caching techniques. In general in a computer system, a file cache refers to a defined portion of volatile memory that is used to store data from a data file. When the data file is initially accessed by a process, some data from the data file can be stored in the file cache. Subsequently, when other processes open a file handle to the file and read data from the file, the data may be directly copied from the file cache, in which case no read request need be sent to the file system. Analogously, when other processes open a file handle to the file and write data into the file, the data may be directly copied to the file cache, in which case no write request need be sent to the file system. Data in a file cache is said to be "dirty" if the data has been changed and has not yet been written into the non-volatile memory (for example hard disks) of the computer system. Periodically, or on demand, a system request may be issued to flush dirty data from the file cache to the non-volatile memory. In embodiments of the data access management systems described herein, file cache management for encrypted data files can be more complex as some processes may be authorized to access the plaintext of the encrypted data file while other processes may only be authorized to access the cipher-text of the encrypted data file. Accordingly, embodiments described herein may monitor the data stored in the cache to ensure that requesting processes are not provided access to data in the file cache for which they are not authorized.

The data protection module can track open file handles for respective data files. A process is said to be holding an open file handle to a data file if the process has not closed the file handle after obtaining the file handle. The data protection module may separately track file handles being held by processes authorized to access the plaintext of an encrypted data file and file handles being held by processes authorized to access only the cypher-text of the encrypted data file. For example, to track open file handles for an encrypted data file, the data protection module may assign the data file a pair of file cache counters.

File cache counters can be assigned to a file if at least one open file handle to the file is being held by some process. A first cache counter can track the numbers of open file handles to the file that are being held by processes authorized to access the plaintext of an encrypted data file. A second cache counter can track the numbers of open file handles to the file that are being held by processes authorized to access the cypher-text of an encrypted data file. An exemplary embodiment of a data structure to be used in the open file handle tracking may be constructed as a hash map between a unique file identifier and a pair of integers corresponding to the file cache counters for that file. In some cases, when the sum of the values of the two counters assigned to the encrypted data file increases from 0 to 1, the data protection module can issue a request to the system to flush all dirty data of the file to the non-volatile memory and then purge all data of the file that is stored in the file cache.

In response to a request from a process for a file handle to an encrypted data file, the data protection module may determine whether the process is authorized to access the plaintext of the encrypted data file or the cypher-text of the encrypted data file. The data protection module may also determine if there are any open file handles to the file. If there are open file handles to the file, the data protection module may determine the authorization level of the process or processes holding the open file handle. If the authorization levels are the same, the requesting process can be providing access to the encrypted data file in accordance with its authorization level.

In some cases, if the authorization level of the requesting process is different from the authorization level of the process or processes holding the open file handle, the requesting process may be denied access to the data file. For example, if the requesting process is authorized to access the plaintext content of the file, but a file handle is being held by a first process authorized only to access the cypher-text, the requesting process may be denied access to the requested file. This may prevent the first process from accessing the plaintext of the file if it were loaded into the cache. Similarly, if the requesting process is only authorized to access the cypher-text content of the file, but a file handle is being held by a first process authorized to access the plaintext, the requesting process may be denied access to the requested file.

In some cases, the data protection module may generate a shadow copy of a requested encrypted data file. In some cases, the data protection module may generate shadow copies for each of the encrypted data files stored on the computer system (e.g. when there is sufficient storage capacity). In response to a request to obtain a file handle to the encrypted data file, the data protection module can provide the requesting process with the file handle to the encrypted data file if the process is authorized to access the plaintext content of the file, and provide the requesting process with the file handle to the shadow copy if the process is only authorized to access the cypher-text content of the file (or vice-versa). This may ensure that processes authorized to access the plaintext content of the file and processes only authorized to access the cypher-text content of the file may always access different copies of the file, and therefore different data in the file cache. The data protection module may synchronize the encrypted data file and the shadow periodically, on demand, or in response to an operation on the file (such as a write operation) to ensure that the encrypted data file and its shadow copy remain identical.

Referring now to FIG. 1, shown therein is an example embodiment of a system 100 that may be used to manage access to a plurality of data files. System 100 is an example of a system that may conduct process-based access policing to encrypted data. System 100 may be implemented as part of a computer system that includes a processor, volatile memory and non-volatile storage memory such as storage component 103. The system 100 may include various other components not shown in FIG. 1, such as a network interface, input devices such as a keyboard or trackpad, and output devices such as a display and speakers.

In some embodiments, system 100 may be implemented to manage access to data files stored on one or more server storage components 103 or end-user computer storage components 103. The physical storage 103 may refer to one or more storage modules using various forms of storage media where files can be stored, such as hard-disks, network-disks, USB drive, CD drive, SD cards, etc.

In general, the system 100 can manage access to protected data files that are user-generated as contrasted with the protected code from the kernel. That is, the protected data files (and encrypted data files) referred to herein correspond to user generated data that is being protected, rather than system files that are used to perform the operations of the kernel.

In some cases, the protected data files may always be stored on the storage component(s) 103 in an encrypted format. That is, whenever a protected data file is stored long-term, it may be stored in the encrypted format. The plaintext content of the protected data file may only be stored temporarily in volatile memory of the system 100, such as in a file cache, when being accessed by an authorized process. The plaintext content of the protected data files may then be flushed from the cache once it is no longer being accessed by the authorized process. This can minimize the period over which the plaintext content of the protected data file is available.

The system 100 may be configured to prevent data breaches and/or known or unknown forms of attacks such as phishing and ransomware attacks. The system 100 may also be integrated with various types of server systems such as SharePoint, Exchange, SQL, Perforce, Web servers, etc. to manage access to the encrypted and protected data transparently. In other cases, system 100 may manage access to data files at the file system level on an endpoint computer.

In general, the kernel 120 of a computer system includes critical codes that are loaded into a protected area of memory. These critical codes are used for resource management such as memory and CPU, device management such as file management for hard-disks, and system call management.

The data protection module, shown here as kernel level file system filter 102, can be integrated into the file management system that manages data files stored in physical storage component 103. For example, the data protection module can be installed as a plug-in to the kernel 120. The filter 102 can receive and handle file access requests from all user mode processes of all user mode applications 101A-101D, and perform process authentication and authorization, among other functions.

The user space 110 in a computer system generally refers to all processes that are not in the kernel. These processes may have limited access to system resources. Specifically, all user mode processes may be required to issue system calls to the kernel in order to access system resources such as file reading/writing.

Each application 101 may have corresponding processes that have different authorization levels in the system 100. For example, processes corresponding to applications 101A may be authorized to access the plaintext of a particular encrypted data file, processes corresponding to applications 101B may be authorized to access only the cypher-text of a particular encrypted data file, and processes corresponding to applications 101C may not be authorized to access a particular encrypted data file.

In some cases, the authorization level for a particular application 101A (and its corresponding processes) may depend on the file being requested. For example, processes corresponding to the Windows Word application may be authorized to access the plaintext of a .doc file, processes corresponding to Acrobat Reader/Writer applications may be authorized to access the plaintext of a .pdf file, processes corresponding to the Notepad application may be authorized to access the plaintext of a text file, processes corresponding to Virtual Studio applications may be authorized to access the plaintext of C/C++ files, and so on.

Examples of the second type of process include file synchronization applications 101B such as Dropbox, OneDrive, GoogleDrive, etc. To prevent the plaintext content of an encrypted data file from being transmitted to a cloud, these file synchronization applications 101B may only be authorized to access the cypher-text content of protected data files so that only the cypher-text of an encrypted data file is synchronized to the cloud.

The third type of processes (corresponding to applications 101C) can include all processes blocked from accessing any encrypted data files. These may include processes that have not been examined by the end user or by an administrator of a server system.

In some embodiments, a user-mode filter companion application 101D may be used to provide a method for an end user to configure the kernel level file system filter 102. This may be particularly useful when system 100 is used to provide data protection on an endpoint computer. Additionally or alternatively, the user-mode filter companion application 101D may communicate with the file system filter 102 to log file access information for data use monitoring and governance.

In this case, a communication channel can be established between the user-mode filter companion application 101D and the kernel level file system filter 102. The file system filter 102 can collect/report information such as processes declined access to an encrypted data file back to the application 101D, which can in turn present an interface for the end user to change the access permission for processes, if so desired. In such an embodiment when an application 101D is employed for configuring the file system filter 102, the application 101D may not require authorized to access any protected files, because the application 101D may not need to access data from any encrypted data file.

In some embodiments where the system 100 is employed for data protection on a server computer, the file system filter 102 may be configured with a fixed configuration map. Accordingly, there may be no need for a user-mode filter companion application 101D and user-mode application 101D may be omitted.

In a server computer the kernel level file system filter 102 may be pre-configured based on service information such as which processes are authorized to access particular encrypted data files. For example, a web developer may implement system 100 to protect php source code while deploying a web service on a public web host. In this case, a web server may call a php interpreter to execute php codes. Thus, the php interpreter can be granted access to plain-text content of all encrypted php files, while all other processes can be declined access to any encrypted php files. This configuration may be predefined by the web developer and hardcoded into the kernel level file system filter 102.

Figure 2:
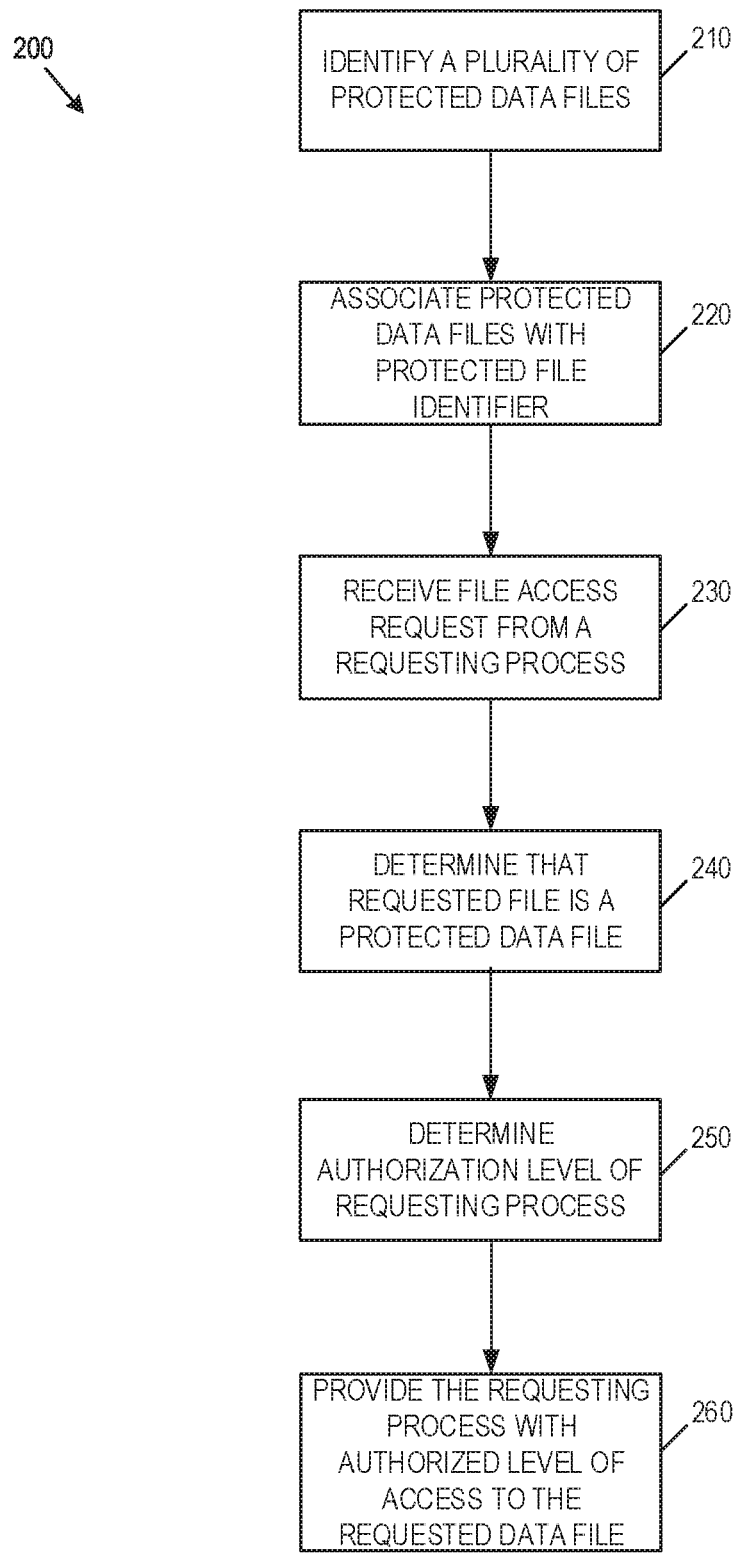
FIG. 2 is a flow chart illustrating an example of a method for managing access to a plurality of data files in accordance with an embodiment.

Referring now to FIG. 2, shown therein is a flowchart illustrating an example method 200 for managing access to a plurality of data files in accordance with an example embodiment. Method 200 is an example of a method for managing access to data files stored on one or more storage modules in a computer system such as system 100.

The steps of method 200 may be implemented using a data protection module 102 installed on the computer system 100. That is, the data protection module 102 may configure the processor of the computer system 100 to perform the steps described in method 200.

At 210, the data protection module can identify a plurality of protected data files in the data files stored on the at least one storage module. The data files stored on the storage module(s) can include both protected data files and unprotected data files. Each protected data file may be stored on the storage module(s) in an encrypted data format. This may prevent the data in the protected data files from being breached unless it is decrypted using the appropriate decryption key. In some cases, the data protection module may initially identify the protected data files by identifying encrypted data files stored on the computer system. The data protection module may also identify the protected data files based on user input identifying specific data files to be protected.

At 220, the data protection module may associate each of the protected data files with a protected file identifier. The data protection module may subsequently distinguish the protected data files from the unprotected data files using the protected file identifiers.

In some cases, the protected file identifier may be in the form of a file storage location. For example, the data protection module may associate a protected file with a protected file identifier by storing that protected data file in a file location within a predefined file directory area that corresponds to a protected file area.

In other cases, the protected file identifier may be associated with a protected file by modifying data associated with the protected data file. For example, the protected file identifier may be a protected file extension appended to the protected data file. Additionally or alternatively, the protected file identifier may be embedded into the file header data and/or included as a file attribute associated with the protected data file.

At 230, a file access request can be received from a requesting process instance operating on the computer system. In general, the requesting process can be a process other than a kernel mode process, such as a user-mode process. The data protection module may receive the file access request prior to its execution e.g. by intercepting all user-mode file access requests. The file access request can include identifying information corresponding to a particular data file whose data content is requested by the requesting process.

At 240, the data protection module can identify the particular data file using the file identifying information. The data protection module can also determine whether the particular data file is a protected data file or an unprotected data file. For example, the data protection module may identify protected data files by identifying the associated protected file identifier.

At 250, the data protection module can determine an authorization level of the requesting process instance. The authorization level may indicate a level of access to the requested file that is permitted for the requesting process (e.g. no access, cypher-text access, or plaintext access).

The data protection module can determine the authorization level by accessing a configuration map stored in the computer system. The configuration map can define authorization level for a plurality of processes that may include the process corresponding to the requesting process instance. In some cases, the corresponding process may not be included on the configuration map (or may not have an authorization level indicated for the particular file). This may indicate that the requesting process instance is not authorized to access the requested file.

The configuration map can define the authorization levels for the processes based on characteristics of the processes themselves. That is, the authorization level of a process instance is determined based on the authorization level of its corresponding process (e.g. and not the specific user accessing the process).

The configuration map can be defined to include a first group of processes having a plaintext authorization level (either generally or for specific data files) and a second group of processes having a cypher-text authorization level (either generally or for specific data files). In some cases, the configuration map may include a third group of processes whose authorization level indicates that no access is to be provided (either generally or for specific data files). Alternatively, the third group of processes may be omitted from the configuration map and this omission may be used to determine that access should be denied.

In some cases, the configuration map may be fixed prior to receiving a file access request. This may be desirable in enterprise or server-based implementations where processes from multiple end-users may request data from the same data files.

Alternatively, the configuration map may be modifiable by the data protection module. The data protection module may determine (i.e. the configuration map may initially define) an initial authorization level of the process corresponding to the requesting process instance. If the initial authorization level indicates that access is to be denied, the data protection module may display a denial notification to a user through a companion user application installed on the computer system. The user may then provide an input through the user application modifying the authorization level for the corresponding process. The data protection module may then update the configuration map based on the modification input.

In some cases, the data protection module may authenticate a requesting process instance prior to providing access to the requesting data file. For instance, the configuration map may include a digital signature of the program that is supposed to correspond to the requesting process instance. The data protection module may access this digital signature information to ensure that the requesting process instance is authentic.

In some cases, the data protection module may also determine whether additional Trojan instructions are present in the requesting process instance. The data protection module may do so by determining that the requesting process instance includes additional process instructions that do not correspond to the known application program. The data protection module may then modify the authorization level if Trojan instructions are detected. This may deny access to the requested data for an otherwise authorized process. This may prevent the Trojan instructions from piggybacking onto the access granted to the authentic process.

At 260, the requesting process instance can be provided with a level of access to the requested data file based on the authorization level of the corresponding process determined at 250.

For example, the data protection module may determine that the corresponding process has a plaintext authorization level for the requested data file. The requesting process instance can be provided with plaintext access to the data file by decrypting the particular data file to provide a decrypted data file, and then temporarily storing the decrypted data file in the computer system cache. The requesting process instance may then access the decrypted data in the cache.

In some cases, the authorization level of the corresponding process may be determined to be a cypher-text authorization level. The requesting process instance may then be provided with access to the particular data file in the encrypted format.

In some cases, providing the requesting process instance with a level of access may include denying access to the requested data file if the corresponding process is not authorized. For example, the authorization level of the corresponding process for the particular data file may be determined to be neither a plaintext authorization level nor a cypher-text authorization level. Providing the requesting process instance with the level of access to the particular data file may then include denying the requesting process instance access to the particular data file.

In some cases, the data protection module may also determine an authorization type for the requesting process instance. For instance, the configuration map may define authorization types for one or more processes. The authorization type may define one or more file operations (e.g. read, write, read/write) that the requesting process is permitted to perform in respect of the requested data file. Providing the requesting process instance with access to the requested data may then include permitting the requesting process instance to perform the file operations associated with the determined authorization type and preventing the requesting process instance from performing operations excluded from the authorization type.

In some cases, protected data files may only be stored on the system in an encrypted format. That is, the protected data files may only be decrypted temporarily in the computer system cache. Once an authorized process no longer requires access to the decrypted data file, the data protection module may flush the decrypted data from the cache to prevent unauthorized access.

In some cases, the data protection module may receive a second file access request for a particular data file. The second file access request may be received from a second process operating on the computer system while a first requesting process is being provided a first level of access to the particular data file. The data protection module may then determine the authorization level of the second process in a manner analogous to the first process.

In some cases, if the data protection module determines that the authorization level of the second process is different from the level of access provided to the first process, the second process can be denied access to the particular data file.

In other cases, if the data protection module determines that the authorization level of the second process is different from the level of access provided to the first process, the data protection module may generate a copy of the particular data file being requested. The data protection module may then provide the second process with the corresponding level of access to the copy of the data file.

Figure 3:
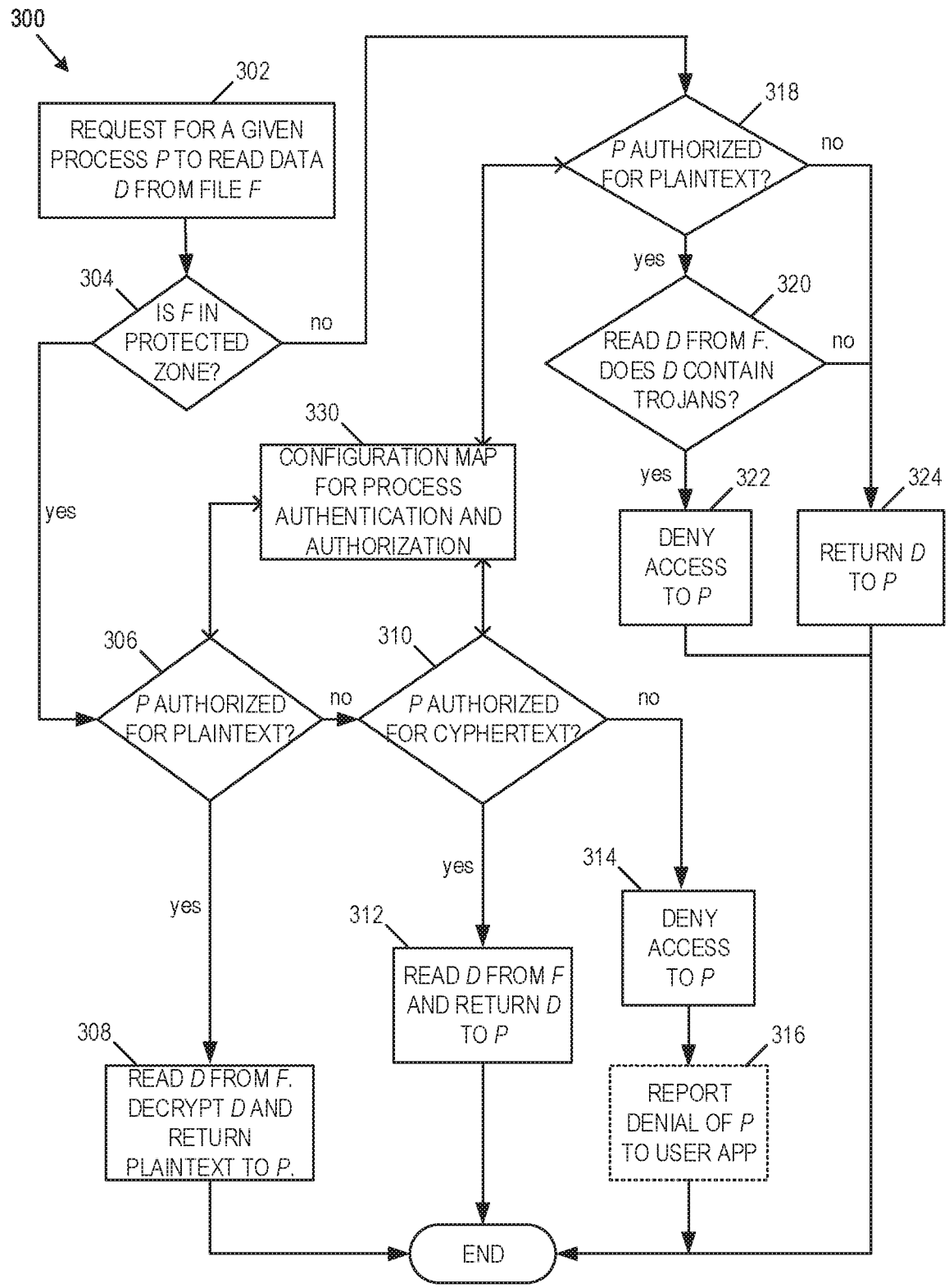
FIG. 3 is a flow chart illustrating an example of method for managing requests to read data files in accordance with an embodiment.

Referring now to FIG. 3, shown therein is an example method 300 for managing requests to read data from a data file stored on system 100. Method 300 may be implemented using the data protection module 102, for example, as a sub-process in implementations of method 200.

At 302, a read request is received from a requesting process P having a corresponding process ID. The read request also includes file identifying information enabling the data protection module to identify the data file F being requested (e.g. by identifying the file path of the data file). The data protection module may also identify requested data D from the file F that is being requested by process P. In the example shown in FIG. 3, the requested process P may be any process currently executing in the computer system while the requested file F may be any data file stored on a storage module 103 in the computer system 100.

In general, the output from method 300 may be one of a valid data buffer (containing either the plaintext content of the target file or the cypher-text content of the target file) and a denial of access (And potentially a user indication of denial) depending on the authorization level of the process P, and whether the file F is a protected data file.

At 304, the data protection module can determine if the requested file is a protected data file. In some cases, the data protection module may determine if the requested file is protected based on the file path. This may be the case where all encrypted data files are stored in a known "protected" directory location. Accordingly, a protected file may be identified by determining that the file path of the requested file is within the "protected" directory location.

Additionally or alternatively, the data protection module may identify modifications to data associated with the requested file. For instance, a protected file extension may be appended to each protected data file and used to identify the protected data files.

Additionally or alternatively, a protected token may be stored in the file header or in any side stream that accompanies a protected file in the file system. The data protection module may then identify the presence of the protected token to determine that the requested file is a protected file. In some cases, particularly when all protected files have been previously identified, the data protection module may store the file paths of all protected files. The data protection module may then use the file path of the requested file to determine if it is a protected file.

If it is determined that the requested file is a protected file (i.e. when F is in the "protected zone") method 300 proceeds to step 306. At 306, the data protection module can determine if the requesting process is authorized to access the plaintext content of the requested file by accessing the configuration map 330. If the requesting process is authorized, the data protection module can decrypt the file F and return the plaintext content of the requested data to the requesting process at 308.

To decrypt the requested file, the data protection module may example encryption key generation methods such as those described herein (and in U.S. patent application Ser. No. 15/178,680) to obtain the file encryption key and decrypt the file. The obtained plaintext content can then be returned back to the calling process through a data buffer D.

As mentioned herein above, a file encryption key may be cached in some embodiments. As such, the encryption key generation method may be employed only once when an encrypted data file is opened to obtain the encryption key, which can be used many times for file reading operations. This may facilitate multiple read operations for the same data file.

If the data protection module determines at 306 that the requesting process is not authorized to access the plaintext content, the method can proceed to 310. At 310, the data protection module can determine if the requesting process is authorized to access the cypher-text content of the requested file by accessing the configuration map 330. If the requesting process is authorized to access the cypher-text, the data protection module can return the requested data from the file F to the requesting process at 312 in its encrypted format.

If the data protection module determines at 310 that the requesting process is not authorized to access the cypher-text content, the method can deny the requesting process access to the requested file at 314. In some cases (e.g. where a user-side companion application is used), the data protection module can provide an indication to the user that the requesting process has been denied access. The user may, in some cases, be permitted to modify the authorization level of the requesting process using the user-side companion application.

This may enable the configuration map to be updated in real-time or on the fly through a channel between the data protection module and the user-mode filter companion application. In other cases, the configuration map may be fixed and hardcoded, e.g., when all programs to be authorized to access the encrypted data are known in the system.

In some cases, prior to determining the authorization level of the requesting process, the data protection module may authenticate the requesting process to ensure that it has not been corrupted by any malware instructions, such as Trojans. The requesting process P can be first identified through the process authentication procedure described in embodiments herein, for instance using a digital signature of an authentic process that may be stored in the configuration map. Once the requesting process is authenticated, the data protection module may then determine the authorization level for that process. If the process is determined to not be authentic, or to include Trojan instructions, its authorization level can be modified to deny access to the requested data.

In some cases, if the requested file is not a protected file (i.e. F is not in the protected zone) the data protection module may return the requested file content back to the requesting process. In some cases, however, such as when the requesting process is determined to be authorized to access the plaintext of other protected files (as at 318), the data protection module may analyze the unprotected file (as at 320) before providing the requesting process with access to the unprotected file at 324 if the unprotected file does not contain malicious code. This may prevent the requesting process from being corrupted, e.g. by Trojans that may be contained within the unprotected process. For instance, the data protection module deny a requesting process access to a requested file at 322, if that requesting process is authorized to access the plaintext content of encrypted data and the data protection module determines at 320 that the requested file is an unencrypted data file that contains Trojan codes.

As a skilled reader will appreciate, the order of the steps shown in method 300 may be varied in different embodiments. For instance, determining the authorization level of a requesting process may occur prior to determining whether the requested file is a protected file. In general, the data protection module may assess two criteria (process authorization level and file protection status) and manage the various combinations of those criteria. Method 300 is one example of a method for managing data access using those criteria.

Figure 4:
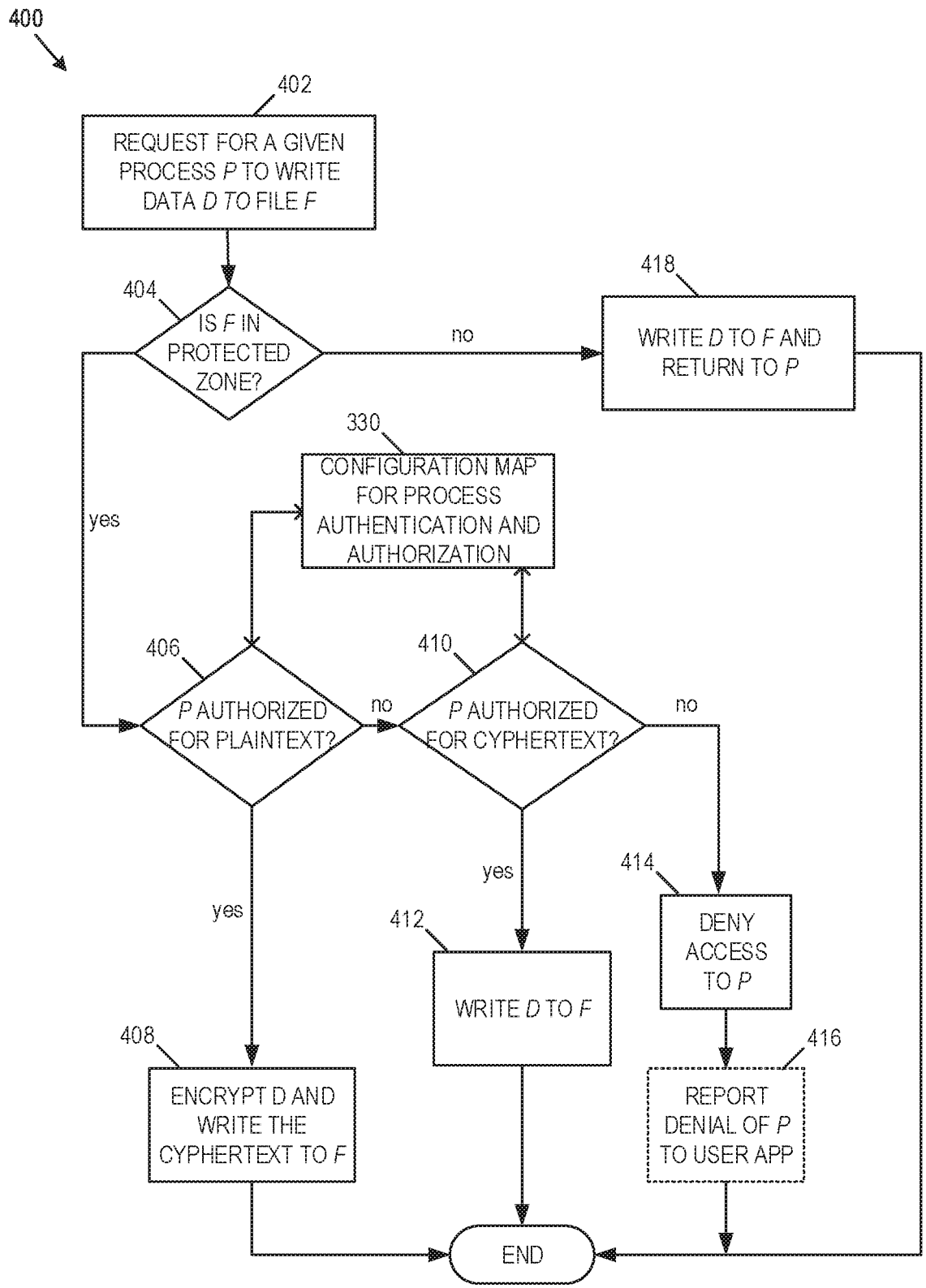
FIG. 4 is a flow chart illustrating an example of method for managing requests to write data to a data file in accordance with an embodiment.

Referring now to FIG. 4, shown therein is an example method 400 for managing requests from a process P to write data D to a requested file F. Method 400 is an example of process that may be implemented by data protection module 102 in system 100.

At 402 a request can be received from a requesting process to write data to a requested file. The request can include file identifying information of the requested file. At 404, the data protection module can determine whether the requested file is a protected file. In general, method 400 may determine if the requested file is protected in a manner analogous to methods 200 and 300 described herein above. If the file is unprotected, then method 400 may proceed to 418 where the process is permitted to write the data to the unprotected file. The updated file may then be provided to the requesting process.

Method 400 may also perform process authentication and authorization for reading and writing operations the same manner as described herein above, e.g. with reference to methods 200 and 300. As with method 300, method 400 can determine at 406 whether the requesting process is authorized to access plaintext content of the protected data file using the configuration map 330.

If the process is authorized for plaintext access, the data protection module can permit the data from the process to be encrypted and stored as part of the protected file that is stored on the storage component 103 in cypher-text. If the process is not authorized for plaintext access, but is determined at 410 to be authorized for cypher-text access, the data protection module can permit the requesting process to receive the file in cypher-text format and write data to that file in cypher-text at 412. If the process is also not authorized for cypher-text access, the data protection module can deny access at 414 and may provide an indication of the denial at 416.

In other words, the authorization of a process for the plaintext content of a file can result in both reading and writing operations by this process being performed using data in a plaintext format (this process can obtain plaintext from the reading operation and send out plaintext for writing). In contrast, the authorization of a process for only the cypher-text content of the file can result in both reading and writing operations by this process being performed using data in the cypher-text format (this process can obtain cypher-text from the reading operation and send out cypher-text for writing).

Method 400 differs from method 300 in that the data D coming from process P at 402 is to be written to a data file F while in method 300 data D is to be read from file F and returned to process P. In some cases, the data D in method 400 may have been in the encrypted format, e.g., when P is a process that is authorized to access cypher text content of an encrypted data file and obtains D by reading it from an encrypted data file. One example may be a cloud application that is synchronizing some encrypted data files. In this case, the data D from the cloud application may be in the encrypted format and can be written to the disk directly.

When a process that is authorized to access plaintext content requests to write to a protected data file, the data protection module may use the various methods described herein for generating encryption keys for existing encrypted data files (if the file already exists) or methods for generating encryption keys for newly created encrypted data files (if the file does not already exist). The obtained key can then be used to encrypt the input data D from the process P and the resulting cypher-text can be written to the file F in the physical storage module 103.

In some cases, to enhance the file writing efficiency, the file encryption key may be cached as described herein above. As such, the encryption key generation method may be employed only once when an encrypted data file is opened or is newly created to obtain the encryption key, which can be used repeatedly for write operations.

The data protection module may also implement encrypted-file cache management methods described herein above to manage cache conflicts and potential cache conflicts. For example, when a process that is authorized to access the plaintext content of a protected file accesses that encrypted data file, the plaintext content of that file may be stored in the file cache. Alternatively, when a process that is authorized to access the cypher-text content of a protected file accesses that encrypted data file, the file cache may be filled with the cypher-text content of the encrypted data file. Accordingly, cache management techniques (e.g. using counters and/or shadow copies) may be used to manage and prevent unauthorized processes from accessing data associated with encrypted data files.

In some cases, the data protection module may be implemented using a two-layer design. For example, the process-based access policing system including the encrypted-file management, process authentication and authorization and Trojan detection for authorized processes, may be implemented on a first upper layer, while encryption and decryption functions including the encryption key generating and caching and the encrypted-file cache management may be implemented on a second lower layer below the top layer.

Furthermore, a skilled reader will appreciate that the combination of functionalities implemented in a particular data protection module may depend on factors such as the kind of data files to be encrypted and protected, the kind of processes to be authorized for various authorization levels, the type of computer system, e.g., a server computer or an endpoint computer, and so forth.

Figure 5:
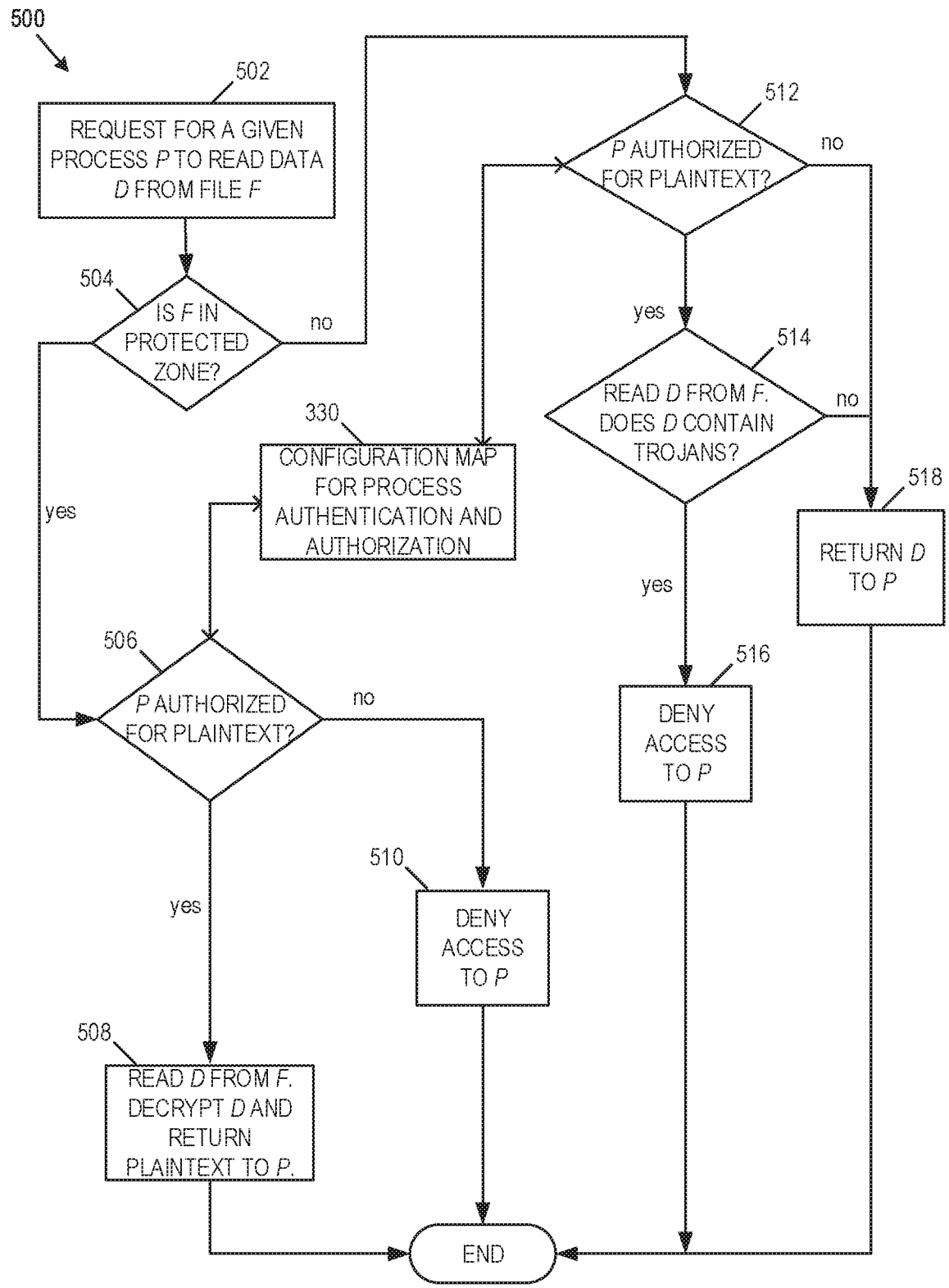
FIG. 5 is a flow chart illustrating another example of a method for managing access to a plurality of data files in accordance with an example embodiment.

For example, the data protection module may be configured to protect a specific subset of files (a plurality of protected files) stored on a server computer and only allow certain processes to access those protected files. Referring now to FIG. 5, shown therein is an example of a method 500 that may be implemented by a data protection module to protected data files stored on a server computer. For example, method 500 may be implemented to provide source code protection for securing scripting code files on a server computer. Such an implementation may be provided in connection with deploying a service using a scripting language to a public host computer or untrusted host computer, where it can be desired for the scripting source code files to be protected.

In some cases, the data protection module may only handle file read operations because the protected files may have been encrypted in advance and need not be changed when they are used in the server system. Thus, the data protection module may not be required to manage file writing operations.

Additionally or alternatively, the processes to be authorized may have been determined in advance and there may be no need to communicate with any user-mode filter companion application, either to report some denial of access or to update a configuration map. That is, the configuration map may be fixed.

The data protection module may respond to each request for file access received at 502. For example, the request may include a process ID P, file identifying information for a file F including the corresponding file path, and a data buffer D as one possible output from the data protection module to the requesting process.

At 504, the data protection module may determine if the requested file F is a protected data file. In an example system for protecting scripting source code files, all files may be encrypted and stored in a fixed directory. Accordingly, the data protection module may determine that the requested file is a protected file by determining if the requested file is stored within this fixed directory. In another case where encrypted data file may be stored in various locations, yet the number of files is small, another method for detecting whether the file F is a protected file can be to hardcode the fixed file paths of all source code files in a list in the data protection module and determine if F is in the list or not.

If the requested file is a protected file, and the data protection module determines at 506 that the requesting process is authorized to access the plaintext content, the data protection module may decrypt the file F and return the plaintext content to the requesting process at 508. If the requesting process is not authorized to access the plaintext content of the requested file, the data protection module can deny access to the requesting file at 510.

When the requested file F is not a protected data file, the data protection module may either conduct a Trojan detection at 514 if the requesting process is determined at 512 to be authorized to access the plaintext content of encrypted data files. If Trojan instructions are detected at 514, access to the unprotected file can be denied at 516. If a Trojan is not detected and/or the requesting process is not authorized to access the plaintext content of encrypted data files, the data protection module may permit the requesting process to access the unprotected file.

In embodiments of a scripting source code files protection system, only the script interpreter may be authorized to access the plaintext content of any encrypted data files.

Accordingly, the interpreter program path and its digital signature may be hardcoded in the data protection module to facilitate process authentication and authorization.

The Trojan detection methods, as described in embodiments herein, can be applied to prevent an authorized process P from executing any script codes that are not encrypted, so that no such script code may be used to abuse the authorization level of process P to breach the plaintext content of protected files. In this scenario, all legitimate script code files can have been encrypted and stored as protected files. The data protection module can then prevent the interpreter from accessing any other script code files to prevent the execution of harmful script codes that may jeopardize the security of the encrypted data files.

Another example implementation may be to protect data such as SQL data stored on a server computer. For example, an implementation for an SQL file protection system may include the following functionalities:

The data protection module may manage file write operations for encrypted data files to enable a SQL files to be modified and re-encrypted. Accordingly, methods of encryption key generation for existing encrypted data files and encryption key generation for newly created encrypted data files can be employed.

The data protection module may also secure all protected files in a defined directory location or locations. This may be facilitated because in a SQL server a given location is usually specified for storing SQL data files.

The data protection module may also hardcode process authentication and authorization data to authorize only two processes to access plaintext content of data files, i.e., the SQL process to access the plaintext content and a backup service process to access the cypher-text content. As there may be switches between plaintext and cypher-text in the file cache, encrypted-file cache management methods described herein can be used. If the process authentication and authorization data is hardcoded, the configuration map can be fixed so there is no need to include functionality to update the configuration map. Nonetheless, a channel between the data protection module and a user-mode filter companion application may still be included to report the denial of access events. This may facilitate recording illegal attempts in a log file for data use monitoring and auditing.

It will be understood by persons skilled in the art that a system similar to the above one may be employed to protect data on a Share-point server, a Perforce server, a mail server such as Exchange, etc. In these servers, specific processes can be authorized to access the plaintext content of some specific data files. Accordingly, implementations similar to that described for the SQL server may be used.

An example implementation of a data protection system for an endpoint computer as described herein may include the following functionalities:

The data protection module may implement both file reading management and file writing management methods for encrypted data files. Accordingly, methods of encryption key generation for existing encrypted data files and encryption key generation for newly created encrypted data files can be employed.

The data protection module may also allow end users to store their protected files in any locations, rather than to be constrained in certain specific folders. The data protection module may then generate a directory tree to identify protected data files.

The data protection module may permit the configuration map to be updated and/or modified by a user. For instance, a duplex channel between the data protection module and a user-mode filter companion application can be provided to allow end users to change the configuration map.

The data protection module may permit one process to access the plaintext content of an encrypted data file at one time and another process to access the cypher-text content of this encrypted data file at another time. Accordingly, the data protection module may manage the file cache, using encrypted-file cache management methods described herein above. For example, the end user may have encrypted data files in a cloud application, such as Dropbox, GoogleDrive, or OneDrive. For those encrypted data files, their cypher-text accessibility can be authorized for the cloud application so that the cloud application can synchronize the encrypted data files to the cloud in an encrypted format. Plaintext content authorization can be granted to other applications such as those used to handle those types of files locally (e.g. Acrobat for a pdf file) so that the end user can interact with those files as usual.

The embodiments described herein may be implemented as systems, methods, devices and computer program products that provide data protection using process-based encrypted data access policing.

Various embodiments of methods for data protection have been described. These include encrypted-file management, process authentication and authorization, Trojan detection for authorized processes, encryption key generation and caching, and encrypted-file cache management. Based on these methods, some process-based encrypted data policing systems are described for data protection against data breaches and known or unknown attacks including ransomware or phishing attacks on either a server system or an endpoint computer.

A number of example embodiments have been described herein. However, it will be understood by persons skilled in the art that other variations and modifications may be made without departing from the scope of the embodiments as defined in the claims appended hereto.

We claim:

1. A method for managing access to a plurality of data files stored on at least one storage module in a computer system using a data protection module installed on the computer system, the method comprising:

identifying, by the data protection module, a plurality of protected data files in the plurality of data files stored on the at least one storage module, wherein the plurality of data files stored on the at least one storage module includes the plurality of protected data files and a plurality of unprotected data files, and wherein each protected data file in the plurality of protected data files is stored on the at least one storage module in an encrypted format;

associating each of the protected data files stored on the at least one storage module with a protected file identifier;

receiving, by the data protection module, a file access request from a requesting process instance operating on the computer system, the requesting process instance being an execution of an application program on the computer system, wherein the file access request includes file identifying information corresponding to a particular data file in the plurality of data files;

identifying, by the data protection module, the particular data file from the file identifying information;

determining, by the data protection module, that the particular data file is one of the protected data files by identifying the associated protected file identifier;

determining, by the data protection module, an authorization level of the requesting process instance based on a process authorization level of a corresponding process determined by accessing a configuration map stored on the at least one storage module that defines authorization levels of a plurality of processes;

authenticating, by the data protection module, the requesting process instance, wherein authenticating the requesting process instance comprises determining whether the requesting process instance is an unmodified genuine instance of the application program; and providing the requesting process instance with a level of access to the particular data file based on the determined authorization level of the requesting process instance, the level of access to the particular data file being granted only to the authenticated requesting process instance, wherein the requesting process instance is authenticated prior to providing the requesting process instance with the level of access.

2. The method of claim 1, wherein the configuration map defines a first group of processes from the plurality of processes having a plaintext authorization level, and a second group of processes from the plurality of processes having a cypher-text authorization level.

3. The method of claim 1, wherein:
the process authorization level of the corresponding process for the particular data file is determined to be a plaintext authorization level; and
providing the requesting process instance with the level of access to the particular data file comprises:
  decrypting the particular data file to provide a decrypted data file;
  temporarily storing the decrypted data file in the cache of the computer system; and
  providing the requesting process instance with access to the decrypted data file in plaintext.

4. The method of claim 1, wherein:
the process authorization level of the corresponding process for the particular data file is determined to be a cypher-text authorization level; and
providing the requesting process instance with the level of access to the particular data file comprises providing the requesting process instance with access to the particular data file in the encrypted format.

5. The method of claim 1, wherein:
the process authorization level of the corresponding process for the particular data file is determined to be neither a plaintext authorization level nor a cypher-text authorization level; and
providing the requesting process instance with the level of access to the particular data file comprises denying the requesting process instance access to the particular data file.

6. The method of claim 1, wherein, for each of at least one protected data file,
associating that protected data file with the protected file identifier comprises storing that protected data file in a file location within a predefined file directory area on the at least one storage module; and
the protected file identifier for that protected data file is the predefined file directory area.

7. The method of claim 1, wherein, for each of at least one protected data file,
associating that protected data file with the protected file identifier comprises modifying data associated with the encrypted data file to include the protected file identifier.

8. The method of claim 1, wherein:
authenticating the requesting process instance comprises:
  determining the application program associated with the corresponding process;
  determining that the requesting process instance is a modified instance of the application program that includes additional process instructions that do not correspond to the known application program; and
  modifying the determined authorization level whereby the providing the requesting process instance with the level of access to the particular data file comprises denying the requesting process instance access to the particular data file.

9. The method of claim 2, further comprising:
determining, by the data protection module, an initial process authorization level of the corresponding process by accessing the configuration map, wherein the initial authorization level indicates that the corresponding process is to be denied access to the particular data file;
displaying a denial notification through a user application installed on the computer system;
receiving a modification input through the user application in response to the denial notification; and
updating, by the data protection module, the configuration map based on the modification input to change the initial authorization level of the corresponding process.

10. The method of claim 1, further comprising:
receiving, by the data protection module, a second file access request from a second process instance operating on the computer system while the requesting process instance has the level of access to the particular data file, wherein the second file access request includes file identifying information corresponding to the particular data file;
determining that the authorization level of the process corresponding to the second process instance is different from the level of access provided to the process corresponding to the requesting process instance;
generating a copy of the particular data file; and
providing the second process instance with the second level of access to the copy of the particular data file.

11. A system for managing access to a plurality of data files, the system comprising:
a processor;
at least one physical storage module coupled to the processor, the at least one physical storage module storing the plurality of data files and a data protection module;
wherein the processor is configured by the data protection module to:
  identify a plurality of protected data files in the plurality of data files stored on the at least one physical storage module, wherein the plurality of data files stored on the at least one physical storage module includes the plurality of protected data files and a plurality of unprotected data files, and wherein each protected data file in the plurality of protected data files is stored on the at least one physical storage module in an encrypted format;

associate each of the protected data files stored on the at least one physical storage module with a protected file identifier;

intercept a file access request from a requesting process instance operating on the processor, the requesting process instance being an execution of an application program on the computer system, wherein the file access request includes file identifying information corresponding to a particular data file in the plurality of data files;

identify the particular data file from the file identifying information;

determine that the particular data file is one of the protected data files by identifying the associated protected file identifier;

determine an authorization level of the requesting process instance based on a process authorization level of a corresponding process determined by accessing a configuration map stored on the at least one physical storage module that defines authorization levels of a plurality of processes;

authenticate the requesting process instance, wherein authenticating the requesting process instance comprises determining whether the requesting process instance is an unmodified genuine instance of the application program; and provide the requesting process instance with a level of access to the particular data file based on the determined authorization level of the requesting process instance, the level of access to the particular data file being granted only to the authenticated requesting process instance, wherein the requesting process instance is authenticated prior to providing the requesting process instance with the level of access.

12. The system of claim 11, wherein the configuration map defines a first group of processes from the plurality of processes having a plaintext authorization level, and a second group of processes from the plurality of processes having a cypher-text authorization level.

13. The system of claim 11, wherein:
the process authorization level of the corresponding process for the particular data file is determined to be a plaintext authorization level; and
the processor is configured by the data protection module to provide the requesting process instance with the level of access to the particular data file by:
decrypting the particular data file to provide a decrypted data file;
temporarily storing the decrypted data file in the cache of the computer system; and
providing the requesting process instance with access to the decrypted data file in plaintext.

14. The system of claim 11, wherein:
the process authorization level of the corresponding process for the particular data file is determined to be a cypher-text authorization level; and
the processor is configured by the data protection module to provide the requesting process instance with the level of access to the particular data file by providing the requesting process instance with access to the particular data file in the encrypted format.

15. The system of claim 11, wherein:
the process authorization level of the corresponding process for the particular data file is determined to be neither a plaintext authorization level nor a cypher-text authorization level; and the processor is configured by the data protection module to provide the requesting process instance with the level of access to the particular data file by denying the requesting process instance access to the particular data file.

16. The system of claim 11, wherein, for each of at least one protected data file, the processor is configured by the data protection module to: associate that protected data file with the protected file identifier by storing that protected data file in a file location within a predefined file directory area on the at least one physical storage module; wherein the protected file identifier for that protected data file is the predefined file directory area.

17. The system of claim 11, wherein, for each of at least one protected data file, the processor is configured by the data protection module to:
associate that protected data file with the protected file identifier by modifying data associated with the encrypted data file to include the protected file identifier.

18. The system of claim 11, wherein:
the processor is configured by the data protection module to authenticate the requesting process instance by:
determining the application program associated with the corresponding process;
determining that the requesting process instance is a modified instance of the application program that includes additional process instructions that do not correspond to the known application program; and
modifying the determined authorization level whereby the providing the requesting process instance with the level of access to the particular data file comprises denying the requesting process instance access to the particular data file.

19. The system of claim 12, wherein the processor is configured by the data protection module to:
determine an initial process authorization level of the corresponding process by accessing the configuration map, wherein the initial authorization level indicates that the corresponding process is to be denied access to the particular data file;
display a denial notification through a user application installed on the computer system;
receive a modification input through the user application in response to the denial notification; and
update the configuration map based on the modification input to change the initial authorization level of the corresponding process.

20. The system of claim 11, wherein the processor is configured by the data protection module to:
receive a second file access request from a second process instance operating on the computer system while the requesting process instance has the level of access to the particular data file, wherein the second file access request includes file identifying information corresponding to the particular data file;
determine that the authorization level of the process corresponding to the second process instance is different from the level of access provided to the process corresponding to the requesting process instance;
generate a copy of the particular data file; and
provide the second process instance with the second level of access to the copy of the particular data file.

21. A computer program product for managing access to a plurality of data files stored on at least one storage module in a computer system, the computer program product comprising a non-transitory computer readable medium having computer-executable instructions stored thereon, the instructions for configuring a processor to:

identify a plurality of protected data files in the plurality of data files stored on the at least one storage module, wherein the plurality of data files stored on the at least one storage module includes the plurality of protected data files and a plurality of unprotected data files, and wherein each protected data file in the plurality of protected data files is stored on the at least one storage module in an encrypted format;

associate each of the protected data files stored on the at least one storage module with a protected file identifier;

receive a file access request from a requesting process instance operating on the computer system, the requesting process instance being an execution of an application program on the computer system, wherein the file access request includes file identifying information corresponding to a particular data file in the plurality of data files;

identify the particular data file from the file identifying information;

determine that the particular data file is one of the protected data files by identifying the associated protected file identifier;

determine an authorization level of the requesting process instance based on a process authorization level of a corresponding process determined by accessing a configuration map stored on the at least one storage module that defines authorization levels of a plurality of processes;

authenticate the requesting process instance, wherein authenticating the requesting process instance comprises determining whether the requesting process instance is an unmodified genuine instance of the application program; and provide the requesting process instance with a level of access to the particular data file based on the determined authorization level of the requesting process instance, the level of access to the particular data file being granted only to the authenticated requesting process instance, wherein the requesting process instance is authenticated prior to providing the requesting process instance with the level of access.

* * * * *